United States Patent [19]

Jouve et al.

[11] Patent Number: 5,032,026

[45] Date of Patent: Jul. 16, 1991

[54] INTERFEROMETRIC SENSOR AND USE THEREOF IN AN INTERFEROMETRIC DEVICE

[75] Inventors: Philippe Jouve, Pontacq; Jacques Pouleau; Francois-Marie Robert, both of Bizanos; Xavier Desforges, Fontenay le Fleury, all of France

[73] Assignee: Societe Nationale Elf Aquitaine Production Tour Elf, Courbevoie, France

[21] Appl. No.: 359,787

[22] Filed: Jun. 1, 1989

[30] Foreign Application Priority Data

Jun. 3, 1988 [FR] France ................................ 88 07389

[51] Int. Cl.$^5$ .............................................. G01B 9/02
[52] U.S. Cl. ..................................... 356/351; 356/352
[58] Field of Search ......................... 356/345, 351, 352

[56] References Cited

U.S. PATENT DOCUMENTS

| | | | |
|---|---|---|---|
| 4,430,565 | 2/1984 | Brogardh et al. | 250/227 |
| 4,533,247 | 8/1985 | Epworth | 356/352 X |
| 4,596,466 | 6/1986 | Ulrich | 356/345 |
| 4,772,786 | 9/1988 | Langdon | 356/352 X |
| 4,778,982 | 10/1988 | Saaski et al. | 356/352 X |

FOREIGN PATENT DOCUMENTS 2595820  3/1986  France.

Primary Examiner—Davis L. Willis
Assistant Examiner—Matthew W. Koren
Attorney, Agent, or Firm—Lowe, Price, LeBlanc & Becker

[57] ABSTRACT

Pressure and temperature are sensed with first and second interferometers having beam paths originating at an optical fiber located at a collimating lens focal point. One interferometer includes a deformable membrane having a deformation responsive to the sensed pressure and temperature which cause the membrane position to vary with respect to a face of a glass plate. In the second interferometer the optical path length varies as a function of the sensed temperature. The collimating lens collects optical beams derived from the first and second interferometers and supplies them to the optical fibre. In one embodiment, the interferometers are coaxial and in parallel; in a second embodiment the interferometers are in series.

22 Claims, 8 Drawing Sheets

INTERFEROMETRIC SENSOR AND USE THEREOF IN AN INTERFEROMETRIC DEVICE

The present invention relates to a double series or parallel interferometric sensor and use thereof in an interferometric optical device for determining, at one or more points, one or more physical magnitudes such as pressure and temperature, which may be represented on interferometric sensors in terms of optical path differences.

The industrial needs for optic sensors are enormous and the arrival on the market of industrially reliable optical fibres for transmitting optical beams over long distances has made it possible to provide industrial optical sensors responsive to a certain number of requirements felt particularly strongly in the petroleum sphere: remote measurements, intrinsic safety, small volume, insensitivity to electromagnetic disturbances and possibility of multiplexing.

Such a sensor has the advantage of being able to make precise remote temperature and pressure measurements, particularly in hydrocarbon or geothermic production wells.

A first aim is to provide a double interferometric sensor in which channelled spectra related to the temperature and pressure variations are combined.

In a first embodiment, this first aim is attained by providing first and second parallel interferometers respectively having concentric central and external beam paths originating at an optical fiber located at the focal point of a collimating lens. The interferometer, having the central beam path, comprises a deformable membrane having a deformation responsive to the sensed pressure and temperature which cause the membrane position to vary with respect to a face of a glass plate. In the second interferometer including the external beam path the distance between two faces of glass plates having parallel faces varies as a function of the different expansion of each of the two plates. The collimating lens collects optical beams derived from the first and second interferometers and supplies them to the optical fibre.

This first embodiment is a double parallel homogeneous interferometer sensor of the "Fabry-Perrot" type.

A second embodiment is considered to be a combined parallel double sensor.

In this second embodiment, the first aim is attained by a structure similar to that of the first structure except that the second interferometer in the path of the external beam includes a polarizer and a bi-refringent plate having a bi-refringence that varies as a function of the sensed temperature.

In third and fourth embodiments for attaining the first aim, the double sensor may have a homogeneous-parallel configuration by arranging two bi-refringent or mixed parallel interferometers and by arranging a bi-refringent interferometer to be responsive to pressure and a Fabry-Perrot interferometer to be responsive to temperature.

In the third and fourth embodiments, the first aim is attained with first and second parallel interferometers having concentric, central and external light beam paths originating from an optical fibre placed at a focal point of a collimating lens. The first interferometer, using the central beam, comprises a polarizer and a bi-refringent plate having bi-refringence that varies principally as a function of the sensed pressure. The second interferometer in the path of the external beam is formed either by an interferometer in which (a) the distance between two faces of two glass plates with parallel faces held in position by a cylindrical spacer varies as a function of the different expansion coefficients of each of these two plates, or (b) a second polarizer and a second bi-refringent plate having a bi-refringence that varies as a function of the sensed temperature for creating a first channelled spectrum which is focused on the optical fibre by the collimating lens. A second channelled spectrum of the central beam is combined with the first channeled spectrum on the optical fibre.

A second aim of the invention is to provide a double interferometric sensor in which the channeled spectra related to the pressure and temperature variations are multiplied.

In a first variant, this second aim is attained by providing first and second series interferometers responsive to a single optical beam derived from an optical fibre placed at a focal point of a collimating lens. The first interferometer includes a deformable membrane having a deformation responsive to the sensed pressure and temperature which cause its position to vary with respect to one face of a glass plate. An optical path having different characteristics determined by the membrane position as a function of pressure and temperature causes a first channelled spectrum to be derived. The second interferometer, placed in the light path, is formed of a polarizer and a bi-refringent plate having a bi-refringence that varies as a function of temperature. The second interferometer, after being traversed twice outwardly and inwardly by the optical energy, derives a second channelled spectrum. A resultant channelled spectrum, representing the product of the channelled spectra of the interferometers, is focused on the optical fibre by the collimating lens.

This first variant of the second aim forms a series mixed double sensor. In the second variant of this second aim, the series homogeneous double sensor is obtained by two Fabry-Perrot interferometers.

In this second variant, the second aim is attained by first and second interferometers in series to respond to a single light beam derived from an optical fiber placed at the focal point of a collimating lens. One of the interferometers is formed of a deformable membrane having a deformation responsive to the sensed pressure and temperature which cause its position to vary with respect to one of the faces of a first glass plate with parallel faces, as a function of these two parameters, so as to obtain an optical path difference characteristic of the position of the membrane. In the second interferometer, the distance between two faces of two glass plates with parallel faces spaced by a cylindrical spacer varies as a function of the different expansion coefficients of the glass plates and of the spacer. This creates a difference of optical path characteristic as a function of temperature. A resultant channelled spectrum is the product of the channelled spectra of each of the interferometers. Optical energy crosses the temperature sensitive interferometer twice and is focused on the optical fiber by the collimating lens.

In a third variant, a series homogenous double sensor is obtained by arranging two bi-refringent interferometers in series and in a fourth variant, a series mixed double sensor may be obtained by arranging a bi-refringent interferometer to respond to pressure and a Fabry-Perrot interferometer.

In these third and fourth variants, the interferometric sensor comprises two series interferometers using a single light beam derived from an optical fibre placed at the focal point of a collimating lens. The first interferometer includes a polarizer and a bi-refringent plate having a bi-refringence that varies mainly as a function of the sensed pressure. The second interferometer in the light path is formed either by a second polarizer and a second bi-refringent plate having a bi-refringence that varies as a function of the sensed temperature or an interferometer in which the distance between two parallel faces of glass plates held in position by a cylindrical spacer varies as a function of the different expansion coefficients of each of these two plates. The resultant channelled spectrum is the product of the channelled spectra of each of the interferometers. The resultant spectrum is focused on the optical fiber by the collimating lens.

A third aim is to propose a use for such a sensor in an optical interferometric device.

In a particular known device, the light beam emitted by a light source is coupled by an optical fibre to a first two wave interferometer operating, for example, in accordance with Michelson's principle; this incident light beam is there divided by a separator system formed by a semi-reflecting mirror into two sub-beams, one of which is reflected by a fixed mirror, whereas the other is reflected by a mobile mirror having a variable position. These two sub-beams, after reflection, are recombined in a separator system. The recombined interfering sub-beams provide an overall optical flux having a spectrum comprising a number of amplitude variations in a given spectral band. The position of these amplitude variations is characteristic of the difference $D_c$ of the optical paths followed by the sub-beams corresponding to the two mirrors. The difference is related to the position of the mobile mirror. This flux is coupled by an optical fibre to a second interferometer which functions as a measurement interferometer. The measurement interferometer also comprises two mirrors, one being mobile with respect to the other, and a separator system formed by a semi-reflecting mirror which divides the light into two sub-beams. These sub-beams are directed towards the two mirrors from which they are reflected, then recombined in the separator system.

The light intensity of the output flux from the measurement interferometer, after recombination of the two sub-beams, represents the degree of correlation between the optical responses of each of the detection and measurement interferometers. In the measurement interferometer, the mobile mirror is moved mechanically until the maximum output flux intensity is detected; the maximum indicates equality of the two optical path differences in the two interferometers. The position of the mobile mirror of the measurement interferometer corresponding to this maximum thus makes it possible to determine the optical path difference of the detection interferometer.

U.S. Pat. No. 4,596,466 amply describes such a construction. This patent also mentions the possibility of replacing the Michelson interferometers by "Fabry-Perrot" interferometers formed of two partially transparent parallel mirrors placed between two lenses at the end of two optical fibres.

In known devices using such a measurement interferometer, the systems for moving and recognizing the movement of the mobile mirror are of two types. In a first type of system, the mobile mirror movement is correlated with mechanical movement over a ball or a crossed roller slide. Apart from the problems of space, there exist problems of friction and of mechanical play, causing precision better than 0.1 micron to be difficult to attain. For small movements of the mirror, for example of a total amplitude of 10 microns, if great measurement dynamics are desired, for example $10^3$ points, it is necessary for sensitivity in measuring the position of the mirror of the interferometer to be better than $10^{-2}$ microns.

In a second type of system, the movement is unknown but it is measured by a laser interferometer on a measurement interferometer, identical to the detection interferometer. The sensitivity of the movement measurement depends on the spectral characteristics of the laser and may be appreciably better than 0.1 micron, but the position of fringes is only known relatively; measurement requires continuous monitoring without any interruption from the position of the mirror corresponding to a zero optical path difference up to the desired movement.

In other known devices, determination of the variation of the difference of the optical paths $D_c$ of the detection interferometer does not use a measurement interferometer. Instead, there is a spectral analysis of the flux from the detection interferometer using a Fourier transform. This spectral analysis makes it possible to obtain the frequency of the fringes as well as their phase, up to the absolute value of $D_c$. This method requires spectrophotometric equipment for analyzing the channelled spectrum, for example a network monochromator, a diode strip and known but unwieldy Fourier transform software algorithms. Furthermore, the sensitivity of this system is not sufficient considering the attenuation in the great fibre length used, for example 6 km outward and inward, for a production well. The accuracy of such devices, which may reach $10^{-3}$ microns, depends on the sampling carried out on the spectrum, and therefore on the spectrophotometer resolution.

While keeping the principle of analysis using a measurement interferometer, while maintaining the advantages of prior art devices, the invention removes the drawbacks thereof, particularly the problems related to size and accuracy.

The device proposed by the invention avoids the use of mobiles parts which are difficult to adjust and does not require heavy mechanical moving parts which increase the time required for measurements. The present invention avoids the risks of malfunctioning, and does away with the problems of drift of reference magnitudes met in prior apparatus with interferometric analysis, as well as mechanical friction which limits sensitivity.

The device proposed is simple, robust, of reduced size, and raises no problem of reproducability of measurements. In addition, it makes rapid and reliable analysis possible, with equal precision, of mixed channelled spectra corresponding to different optical path differences $D_{c1}$ and $D_{c2}$ or else the analysis of several spectra from different detection interferometers having closely related optical path differences but analyzed sequentially. This device therefore makes possible the analysis of information coming from interferometric sensor assemblies having different optical path differences $D_c$, each representing the same or different physical magnitudes. The device makes it possible to perform absolute measurements of the optical path differences $D_c$ of the measurement interferometer.

This third aim is attained with an interferometric optical device for measuring multiple physical magnitudes capable of creating optical path difference variations, comprising:

1—an emitter device emitting optical flux with a wide spectral band;

2—a detector assembly comprising at least one mixed or homogeneous double sensor formed of two series or parallel interferometers creating a composite channelled spectrum having propagation rate differences $D_{c1}$ and $D_{c2}$;

3—an optical fibre and coupler assembly comprising a branch for conveying the light flux from the emitter device to the detector assembly and a branch for conveying in the reverse direction the light flux reflected by the detector assembly;

4—an analysis device for analyzing the information carried by the light flux derived from the detector assembly and deriving a value representative of the physical magnitude measured; the analysis device comprises:

4a—a two wave measurement interferometer comprising an input collimator illuminated by the end of the optical fibre, a first mirror from which a part of the collimated light flux delivered by the double sensor is reflected and a second mirror from which the other part of the collimated light flux is reflected and means for causing the two fluxes reflected from the first and second mirrors to interfere and for deriving a resultant output light flux;

4b—photoelectric detector for measuring the intensity of the light flux from the measurement interferometer and deriving a signal representative of the light flux intensity; and 5—an assembly for processing the signal from the photoelectric detector for deriving a value representative of the physical magnitude.

In this arrangement the second mirror of the measurement interferometer is fixed on a piezoelectric micropositioner-measurer that provides fine movement of the second mirror to precisely measure the corresponding movement. The processing assembly is connected to the photoelectric detector and to the micropositioner-measurer for controlling and determining the absolute position of the second mirror at a position where the maximum light intensity is received on the photoelectric detector. The values $D_{c1}$ and $D_{c2}$, required for evaluating the desired physical magnitude or magnitudes, are derived from a processing assembly.

In a second characteristic, the reference mirror of the measurement interferometer is equipped with means for varying the optical path by a known value. This may be required for bringing the optical differences $D_{c1}$ and $D_{c2}$ into the movement range of the micropositioner-measurer.

This shift may be obtained by interposing transparent blades with a known optical difference in front of the fixed and mobile mirrors of the measurement interferometer. A glass plate of thickness E, transparent in the spectral range of the optical source, creates an optical path difference $D=(n-1)E$, n being the refraction index of the plate. Two plates or sets of plates of respective thicknesses Ei and Ej, placed respectively in front of the fixed and mobile mirrors, create an optical path difference D dependent on the thickness difference E between these two plates or sets of plates. A stack of two or more micropositioner-measurers may also provide this shift without modifying the measurement resolution.

In the interferometric optical device of the invention, the optical fibres make it possible to work in white light, i.e., with wide band spectra.

Amplitude variations in the spectrum of a wide band source when certain wavelengths are extinguished in this spectrum. The wavelengths where these variations occur correspond to destructive interferences in an interferometer forming the sensor which may be caused by white and polarized light index variation, or by distance variation between two partially reflecting surfaces, one of which is reference surface, the other having a position responsive to the physical magnitude to be measured. The physical magnitudes to be measured (pressure, temperature, force or movement) cause an optical path difference variation: measurement of the movement of a mobile surface or optical path variation by birefringence. In these cases, the optical path difference characterizing the physical magnitude to be measured at the level of the sensor interferometer is $D_c=2e$, where e is the difference in position between the fixed reflecting reference surface and the position of the mobile reflecting surface subjected to the physical magnitude to be measured or $D_c=2(n_o-n_e)e$ in the case where the sensitive element is a birefringent plate of thickness e through which the light passes twice.

The measurement interferometer of the device analyzing the flux from the sensor is formed by a two wave interferometer of the Michelson type, for example. The two wave interferometer comprises two mirrors, one being moved by a piezoelectric ceramic forming the micropositioner-measurer using the reverse piezoelectric effect and enabling the travelling rate difference of the measurement interferometer to be determined in an absolute way. In the head of the piezoelectric ceramic is integrated a movement sensor working in a closed loop and which eliminates hysteresis, non-linear phenomena and the influence of temperature.

With these advantages, the invention finds a privileged field of application in the measurement of the same physical magnitude, for example pressure, at multiple points (we then have a network of optical pressure sensors) or in the measurement of different physical magnitudes at the same point.

In a preferred embodiment of the interferometric optical device for measuring a so-called main physical magnitude, in accordance with the invention, the double detection sensor uses two interferometers one of which measures the main physical magnitude and the other an influence magnitude required for correcting the main physical magnitude.

Other features and advantages of the present invention will be clear from the following description with reference to the accompanying drawings in which.

Figure 1:
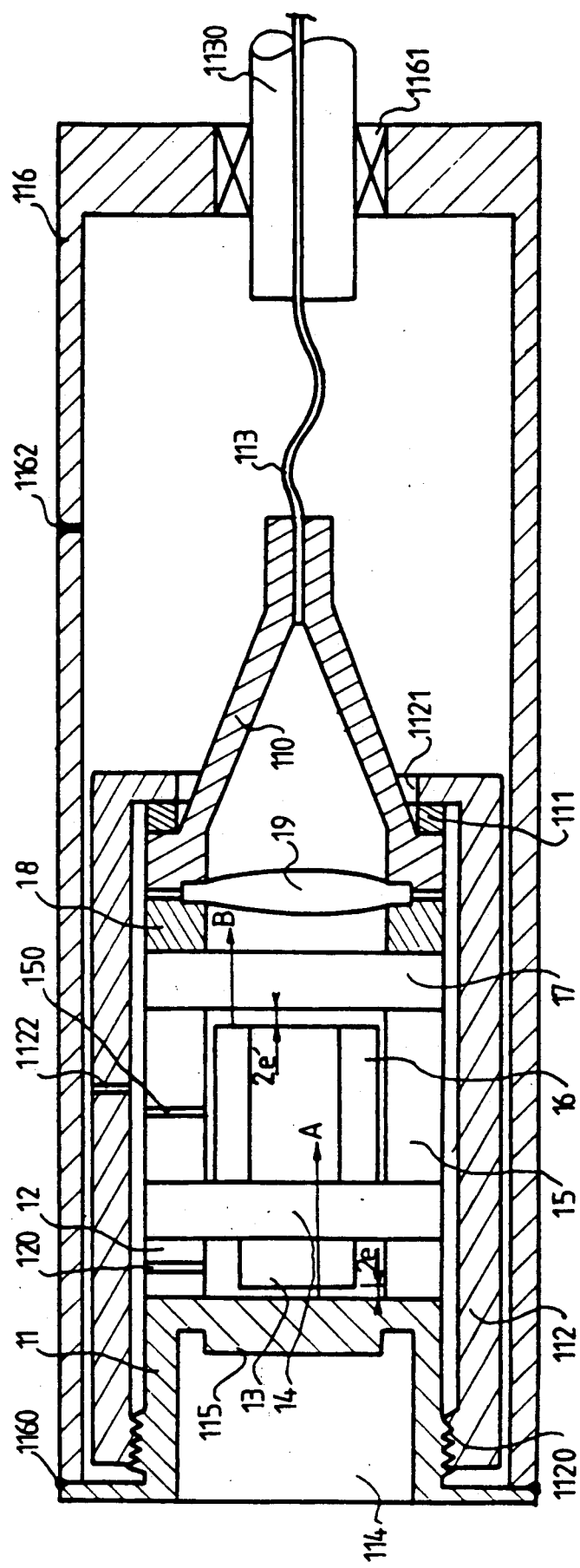
FIG. 1 is a section view of a double homogeneous parallel interferometric sensor of a preferred embodiment of the invention.

The double interferometric sensor, called "parallel homogeneous sensor" shown in FIG. 1 includes a hollow cylindrical clamping ring (112) in which a cylindrical ring (11) forming a blind hole (114) is screwed at its end (1120); this blind hole is closed by a flat face (115) formed by a metal membrane which is deformable as a function of the pressure and temperature to which the sensor assembly is subjected homogeneously. This membrane bears at its periphery on a spacer ring (12) of thickness (E2), made from glass with an expansion coefficient ($\alpha 1$). On this cylindrical spacer ring (12) is bonded a plate (14) with parallel faces; plate (14) is formed of glass with the same expansion coefficient ($\alpha 1$) as ring (12). On the face of plate (14) turned towards the deformable membrane (115) is bonded a plate (13) with parallel faces formed by glass with the same expansion coefficient ($\alpha 1$); this plate (13) has a thickness (E3). A second plate (17) with parallel faces, formed by glass having an expansion coefficient ($\alpha 2$), is placed at a distance (E5) by a cylindrical spacer (15) formed of glass having the same expansion coefficient ($\alpha 2$). Inside the cylinder (15) is provided a second hollow cylinder (16) having a thickness (E6) less than (E5). The internal diameter of this hollow cylinder (16) corresponds approximately to the external diameter of the plate with parallel faces (13). This cylinder (16) is formed of glass with expansion coefficient ($\alpha 1$) and is bonded to the plate (14). On the second plate (17) is bonded a last spacer (18) for mounting a collimating lens (19). On the edges of this collimating lens (19) also rests the base of cone (110) having a cylindrical, bored end which supports light transmission fibre (113); the end of fibre 113 in cone 110 is at the focal point of the collimating lens 19. Finally, a set of resilient washers (111) bearing on the external face of part (110) and on the shoulder defining the central opening (1121) in the clamping ring (112) holds the different elements together.

A casing (116) outside the clamping ring (112) which isolates the sensor from the environment is fixed sealingly to the membrane ring (11), for example, by welding bead (1160) and in addition provides sealing, by a sealing ring (1161) on the cable (1130) which contains the optical fibre (113). To enable a vacuum to be originally created in the sensor assembly, orifices (120, 150 and 1122) are provided, as is orifice (1162) in the external casing (116); orifice (1162) is plugged again once a vacuum has been created. On the outside of cylindrical wall (116) are the pressure and temperature of the production well to be monitored.

In operation, membrane (115) of the sensor is subjected to the pressure and temperature of the production well. Under the action of these two parameters, membrane (115) moves to vary the distance e equal to the difference of the thicknesses (E3) and (E2) of the respective plates (13) and (12). As the distance (e) varies, a central light beam transmitted by fibre 113 via lens 19 to a first, central interferometer defined by the space between the opposed adjacent surfaces of membrane 115 and plate 13 in the vicinity of the axis of symmetry of the sensor along the path (A) has its amplitude modified as a function of the movement of the membrane (115). On the other hand, an annular light beam transmitted by fibre 1113 to lens 19 to a second interferometer defined by the space between the opposed adjacent faces of cylinder 16 and the periphery of plate 17, along the path shown by the arrow (B), travels the distance (e') separating cylinder (16) from the plate (17). The distance e varies as a function of temperature and pressure because of the difference of the respective expansion coefficients ($\alpha 1$) and ($\alpha 2$) of cylinder 11 and plate 17 resulting in differential movement thereof along the sensor axis. Consequently, the amplitude of the optical beam propagating along path B is modified in amplitude as a function of this variation. The beams from the two interferometers are mixed at the input of the fibre (113); the amplitude of the light incident on fibre 113 represents the distances 2e and 2e' travelled by the beams. The distances 2e and 2e' of the beams in traversing the first and second interferometers, by way of example, are 300 and 400 microns, respectively. A circuit described subsequently responds to the variations due to 2e and 2e' that occur as a function of the pressure and temperature variations to which the sensor is subjected. In the embodiment of FIG. 1, the elements (12, 13, 14, and 16) are bonded together and the elements (15, 17) are also bonded together. The abutting faces of plate (14) and cylinder are not bonded to allow the different expansion to develop.

In a variant of the sensor, the cylinder (16) may be bonded to the plate (17). In this variant, the second plate (17) and the second cylinder (16) have the same expansion coefficient ($\alpha 2$), whereas the cylindrical spacer (15) has an expansion coefficient ($\alpha 1$).

Figure 2:
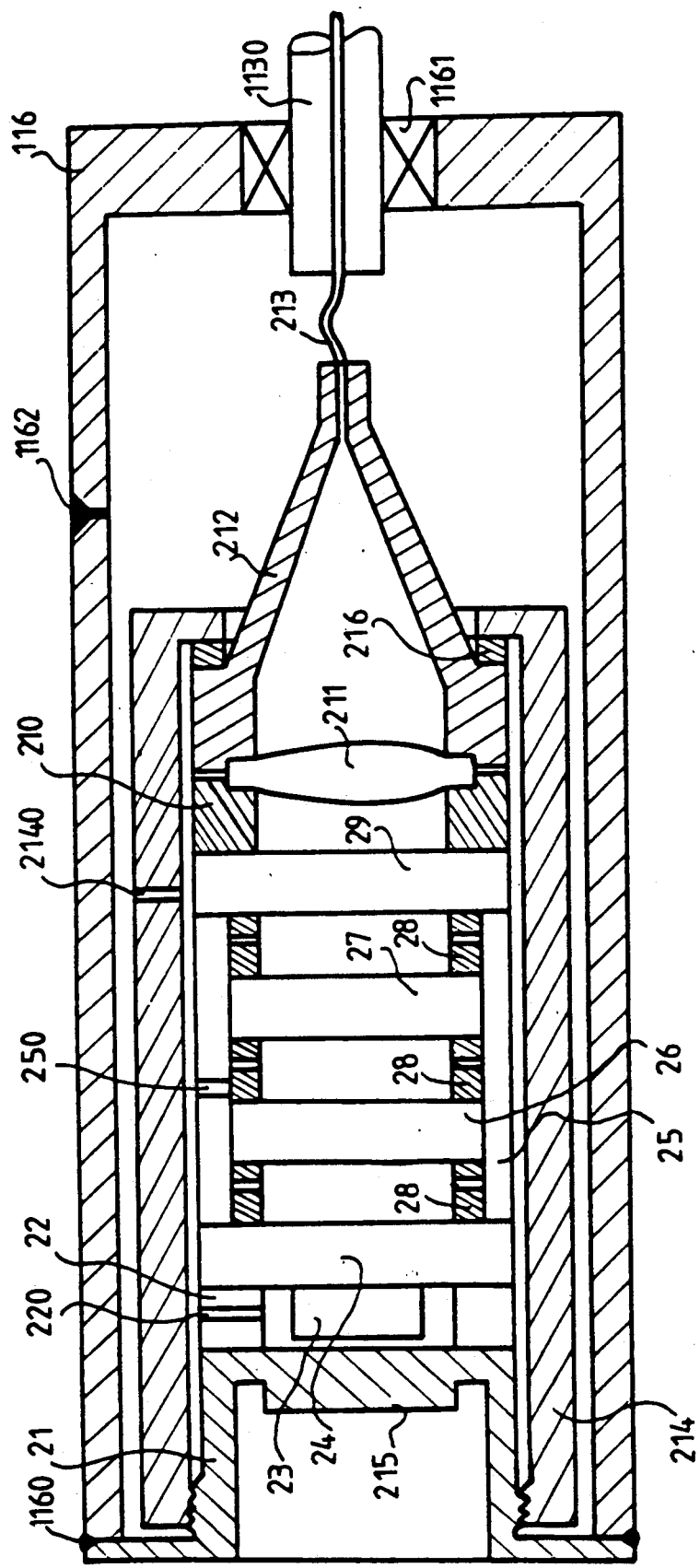
FIG. 2 is a section view of a double mixed series interferometric sensor of another preferred embodiment of the invention.

In FIG. 2 is shown a second type of double interferometric sensor called "series mixed sensor" including clamping ring (214) and the deformable membrane (21) having plate segment (215). The first interferometer of this sensor is also formed by cooperation of the right face (as shown) of plate (215) with parallel faces of plates (23) and (24) and the spacer (22). These elements behave in the same way as the elements (11, 12, 13, 14). A second interferometer is formed by stacking a spacer (28), a polarizer (27), a spacer (28) and a birefringent crystal (26) of thickness (E6), for example made from lithium niobate (LiNbO$_3$) whose birefringence depends on temperature. This second interferometer generates a channelled spectrum having amplitude variations as a function of the temperature to which the sensor is subjected. This stack is contained in the hollow cylindrical spacer (25), closed at both ends by the bonded plates with parallel faces (24) and (29). Finally, the sensor ends in a mounting spacer (210) supporting a collimating lens (211) and an optical fibre support (212) as in the preceding embodiment.

The sensor of FIG. 2 also comprises resilient washers (216) so that the assembly can bear on the edges of the deformable membrane (21). The resilient spacers (28) compensate for the variations of thickness of the sum of parts (26) and (27) due to the temperature with respect to the expansion variations of spacer (25). As in the first type of sensor, orifices (220, 250, 2140, 1162) are formed in the different parts so as to be able to create the original vacuum after having fitted an external casing (116), to provide a seal on the cable (1130) containing the optical fibre (213).

In the case of the sensor of FIG. 2, the channelled spectrum, created by the successive passage of the collimated light beam through the second interferometer, then the first interferometer, then after reflection again through the second interferometer, is focused by the collimating lens (211) on the optical fibre (213). Consequently, the light beam leaving the sensor has a spectrum formed of the product of the channelled spectra generated by each of the two interferometers due to the pressure and temperature variations modifying the birefringence and thickness (E6) of the plate (26).

The embodiment of FIG. 1 thus includes two parallel Fabry-Perrot interferometers (referred to as parallel homogeneous sensors) while the embodiment of FIG. 2 includes a Fabry-Perrot interferometer associated in series with a bi-refringent interferometer, referred to as a mixed series sensor. A series homogenous sensor may be formed by associating in series two bi-refringent interferometers or else another parallel homogenous sensor by arranging two bi-refringent interferometers in parallel. Similarly, a parallel mixed sensor may be formed by arranging a bi-refringent interferometer in parallel with a Fabry-Perrot interferometer, wherein the bi-refringent interferometer is basically a first interferometer sensitive to the pressure and a second temperature sensitive interferometer. The above sensors may be used in any interferometric measuring device and in particular with the device described hereafter.

Figure 3:
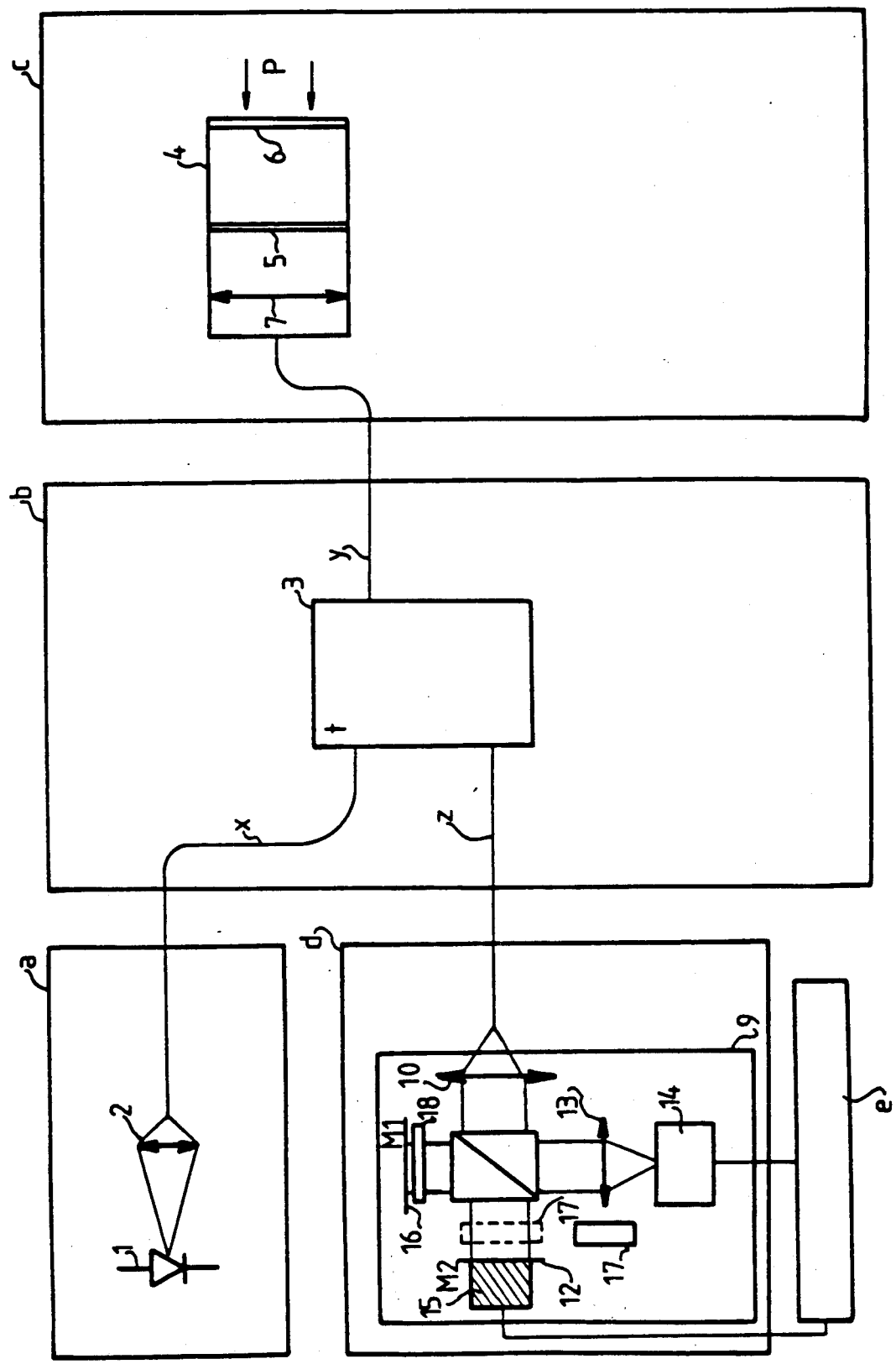
FIG. 3 is a schematic drawing of a general construction of the device.

As illustrated in FIG. 3, the complete device includes a light emitting device (a), a light flux transmission system (b), a detector assembly (c) including a double sensor of the type illustrated in FIG. 1 or 2, a measuring system (d) and a processing system (e).

Figure 6:
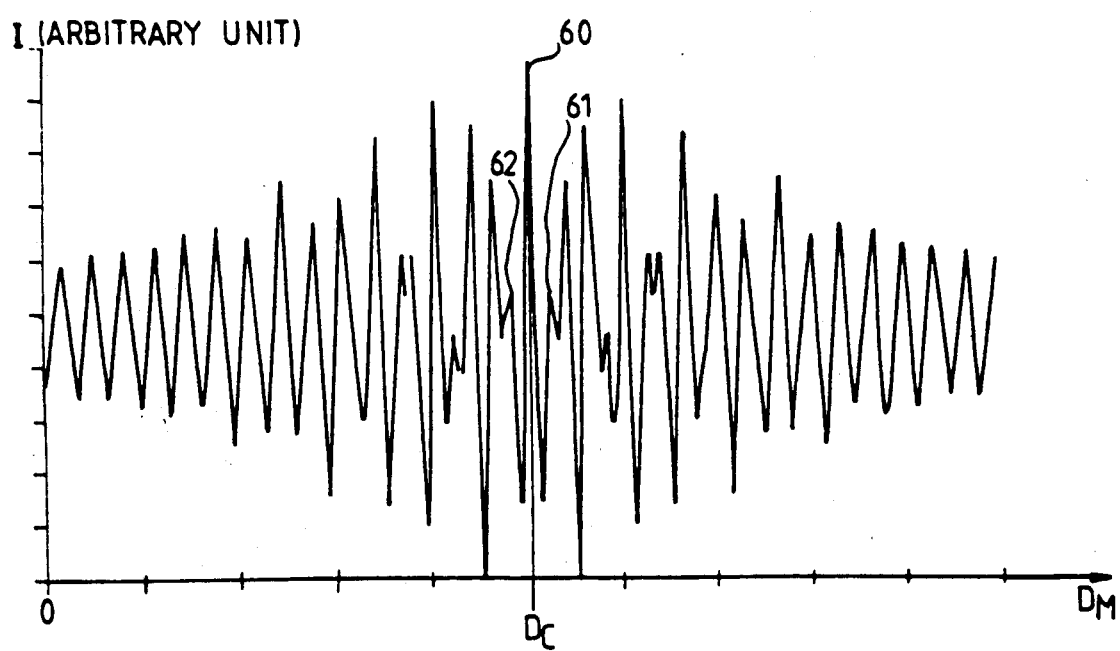
FIG. 6 is an illustration of the signal delivered by the photodetector which is the function of intercorrelation of the interferometers of the sensor and measurement in the case of a light source with two different light emitting diodes.
Figure 7:
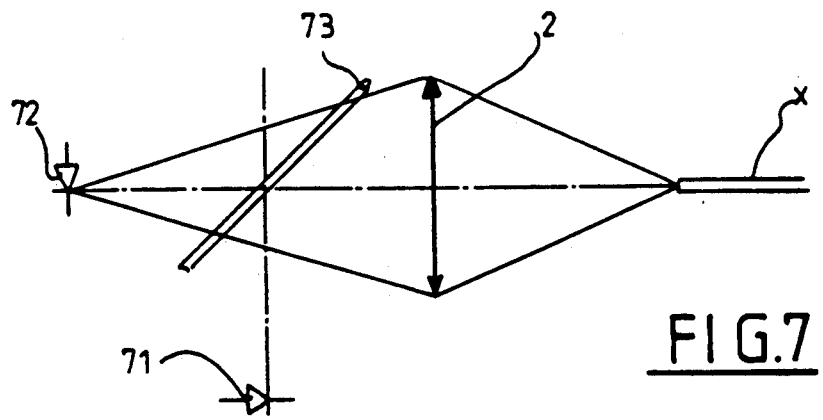
FIG. 7 is a diagram of one embodiment of a double spectrum light source.

The emitting device (a) is formed, as shown in FIG. 3, as an optical source, for example a light emitting diode (1), for deriving light flux focused on the input of an optical fibre (x) of a transmission system (b) by condenser (2). In some embodiments, preferably two diodes or a plurality of wide band diodes may be used to produce spectra. The maxima of each of these spectra coincide with each transmission attenuation minimum of an optical fibre; the minimum attenuations are respectively about 800, 1300 and 1500 nanometers. The most advantageous source, shown in FIG. 7, has a first spectrum centered on 800 nanometers and a second spectrum centered on 1300 nanometers. The wide band source is formed of a first light emitting diode (71) emitting in the first spectrum, a second light emitting diode (72) emitting in the second spectrum and a dichroic plate (73) with a stiff front centered half way (about 1050 nanometers) between the emission maxima of the two diodes. This dichroic plate (73) transmits all of the spectrum of the diode (72) that is centered at 1300 nanometers and reflects all of the spectrum of diode (71) that is centered at 800 nanometers. By combining the outputs of at least two light emitting diodes having maxima centered on the attenuation minima of the fibers there is, as shown in FIG. 6, a considerable increase in the difference between two maxima of the crosscorrelation function; e.g. there is an increase in the difference between main maximum (60) and the adjacent maxima (61) and (62) in the vicinity of the maximum (60). This leads to a better detection margin with respect to the measurement noise; in addition, the availability is better with two diodes than with a single diode.

The optical flux transmission system (b) is formed by a sub-assembly comprising three optical fibers (x, y, z) and a coupler (t). The coupler transfers the optical flux on the outward path, from the source x to y as well as the flux from the double sensor towards fibre z. The fibres may have any length.

The assembly (c) comprises a double sensor (4), of one of the two types described above, illuminated by optical energy coupled from fibre x to fibre y. Assembly (c) includes collimating lens (7) and two "series" or "parallel" interferometers (5) and (6). The interferometer (5) is sensitive to the temperature and the other interferometer (6) is sensitive to the pressure and to the temperature (semi-reflecting mirror 13 and membrane 115, FIG. 1 or plate 23 and membrane 215, FIG. 2).

The collimating lens (7) responds to light from the optical fibre y and couples it to interferometers 5 and 6. On the return journey lens 7 focuses the optical flux from interferometers 5 and 6 at the input of fibre y.

This optical flux has a composite channelled spectrum which is the sum for the parallel sensor, or the product for the series sensor, of the channelled spectra due to each of the interferometers being sensitive to temperature and to pressure and temperature.

The optical flux propagating through fibre (z) is coupled to the analysis interferometer assembly (d), where it passes through a collimation lens (10) and through a separator system (11) which divides the flux into first and second sub-beams, respectively reflected by a stationary reference mirror M1 (16) and a movable mirror M2 (12) connected to a piezoelectric micropositioner-measurer (15), which undergoes the movement to be measured.

The optical fluxes reflected by each of the two mirrors M1 and M2 interferes at the level of the separator system (11). The optical flux passes through a condenser lens (13) and illuminates a photoelectric detector (14). The micropositioner-measurer (15) and photoelectric detector (14) are connected to a control and processing device (e).

Figure 5:
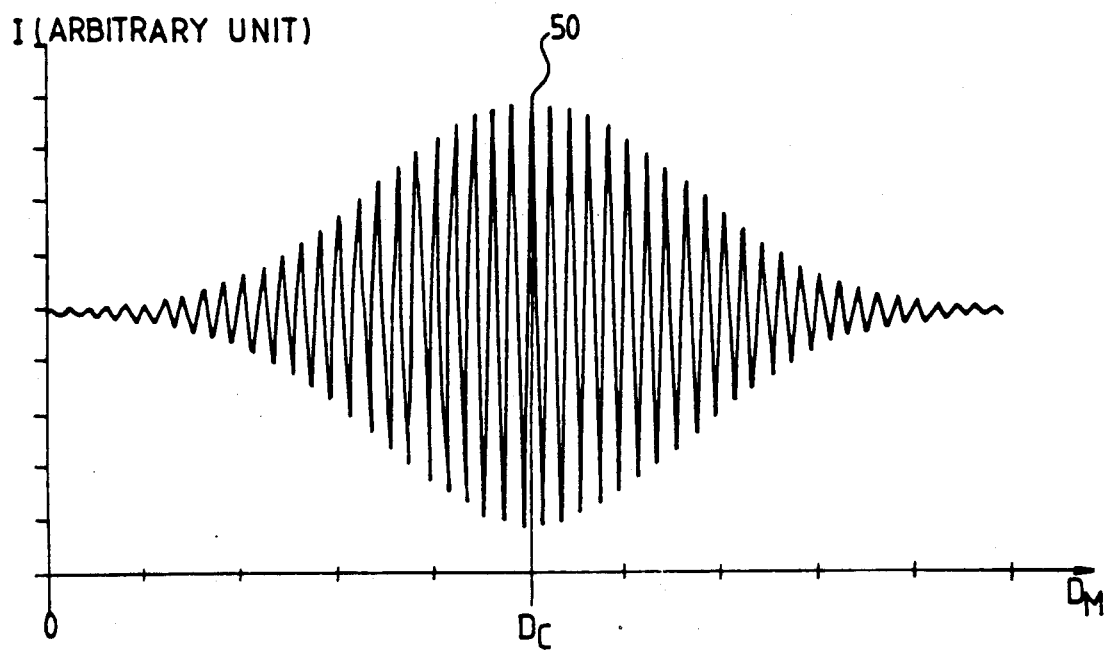
FIG. 5 is an illustration of the signal delivered by the photodetector which is a crosscorrelation function of the interferometers of the sensor of a single interferometer and measurement in the case of a light source with a single light emitting diode around $D_c$.
Figure 11:
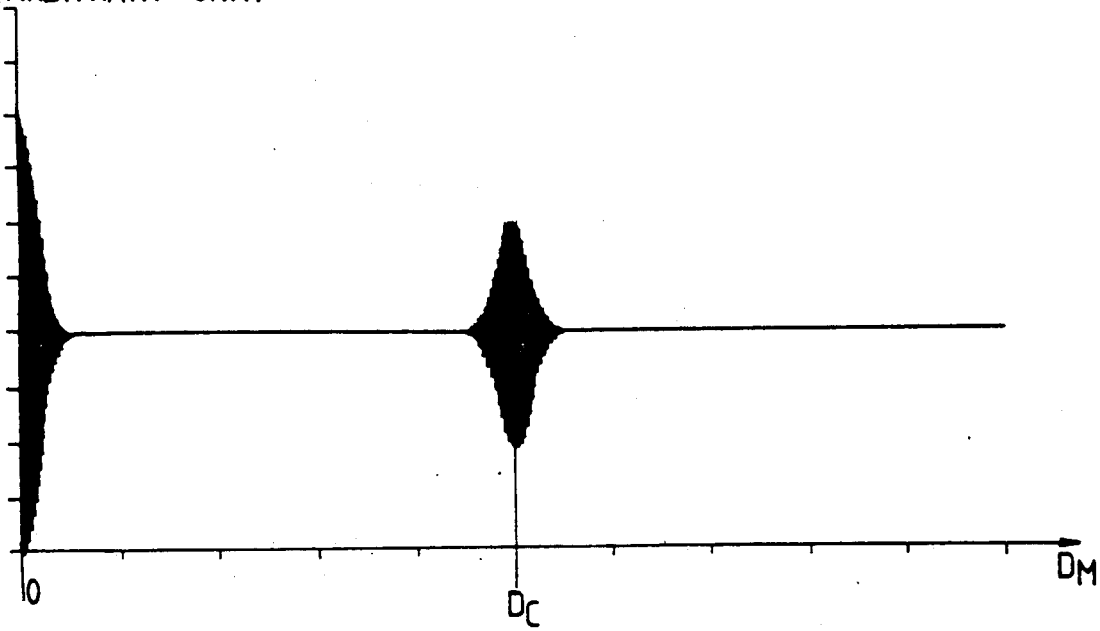
FIG. 11 is a waveform of a crosscorrelation function from $D_m=0$ under the same conditions as those of FIG. 5.

The relative positions of mirrors M1 and M2 define an optical path measurement difference $D_m$ which is modified by micropositioner-measurer (15) responding to an electronic control system to move the mobile mirror M2. The optical flux arriving on the photoelectric detector passes through a series of maxima, as shown in FIG. 5; the maxima progressively increase and decrease in the vicinity of the "main maximum" (50). This main maximum (50) occurs when there is an equality of the two optical path differences $D_c$ and $D_m$ in the sensor (4) on the one hand and measurement interferometers (11, 12, 16) on the other hand. A second maximum appears in the crosscorrelation function for $D_m=0$, FIG. 11.

Figure 12:
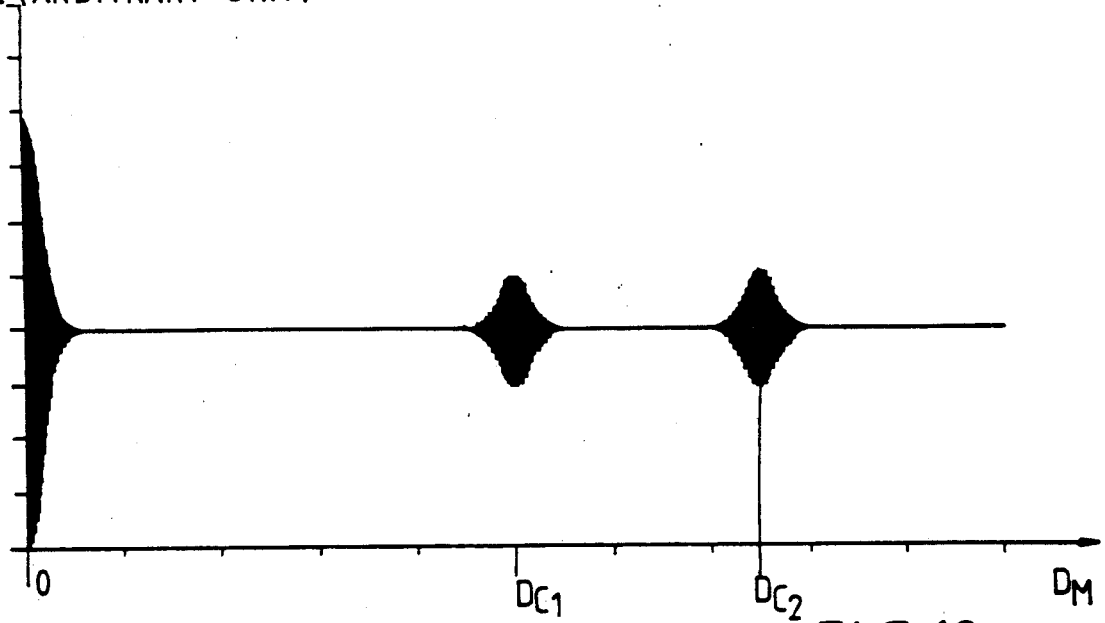
FIG. 12 is a waveform of a crosscorrelation function in the case of a double sensor $D_{c1}$ and $D_{c2}$ and a light emitting diode.

Measurement interferometer 9, when illuminated directly by the source, transmits optical flux having a channelled spectrum characteristic of the optical path difference $D_m$ of the measurement interferometer. Measurement interferometer 9, when illuminated by optical flux having a channelled spectrum associated with an optical path difference $D_c$, derives an output having a flux intensity representing the correlation level between the channelled spectra associated with the optical path differences $D_m$ and $D_c$. Double interferometric sensor (4) has a composite channelled spectrum which is the sum of two channelled spectra due to the two interferometers (5) and (6) in the case of a "parallel" sensor. In this situation, the intensity of the output flux collected by photodetector 14 has three main maxima, one of which corresponds to a no movement of the measurement interferometer representing the fact that there is no destructive interference and that all the energy which enters the interferometer leaves again and the others corresponding to travel differences in the measurement interferometer equal, in absolute value, to that of the double sensor: $D_m = D_{c(1)}$ or $D_{c(2)}$, (FIG. 12) where: $D_{c(1)}$ equals the travel difference of the first interferometer (5), FIG. 3, and $D_{c(2)}$ equals the travel difference of the second interferometer (6), FIG. 3. From these two travel the true pressure and temperature in the production well are calculated.

In the case where the travel distances $D_{c1}$ and $D_{c2}$ are excessively different from each other, the zero of the measurement interferometer can be shifted by a small known value by providing a set of plates having small known optical path differences. The plates are placed in front of the mirrors M1 or M2 of the measurement interferometer. In the case of a considerable shift, a single plate (17, FIG. 3), is disposed in front of mirror M1, or a single plate (18) is disposed in front of mirror M2.

In FIG. 6 is shown the cross correlation function between one of the sensor interferometers and the measurement interferometer when the light emitted by the source is formed by the sum of the spectra of two light emitting diodes having spectra respectively centered on 800 and 1300 nanometers with a spectrum width of about 100 nanometers. With this configuration, the maximum (60) is more readily determined since there is greater contrast between the main peak (60) and the side peaks (61) and (62).

The use of a series detection system in the same sensor on the same fibre, with analysis of the signal using a system for absolute measurement of the movement, combined with the use of a set of plates with parallel faces for bringing the travel differences back into the range of movement of the measurement system with widening of the spectrum of the source using several transmission windows of the optical fibres so as to improve detection and protection with respect to measurement noises, makes it possible to obtain a measurement accuracy better than 0.1% in a pressure range of 200 bars and a temperature range of 150° C., at a measurement point at about 3 km, in a hydrocarbon production well.

In order to optimize both the level and contrast of signals derived by the photodetector, reflection coefficients will be chosen for the plates with parallel faces of the interferometers of the double sensor between 0.4 and 0.95. Advantageously, the reflection coefficient is between 0.4 and 0.7.

Figure 4:
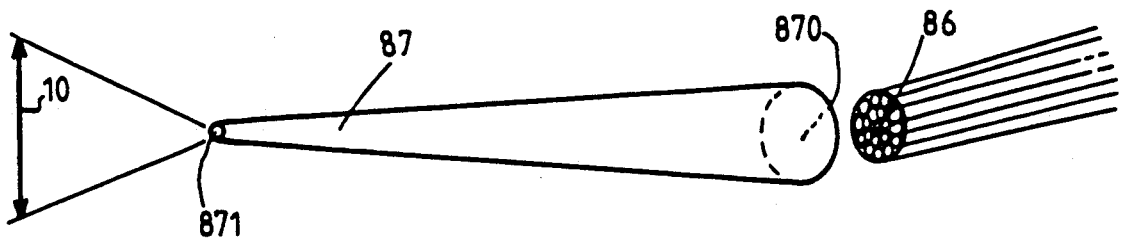
FIG. 4 is a perspective view of a concentrator.
Figure 8:
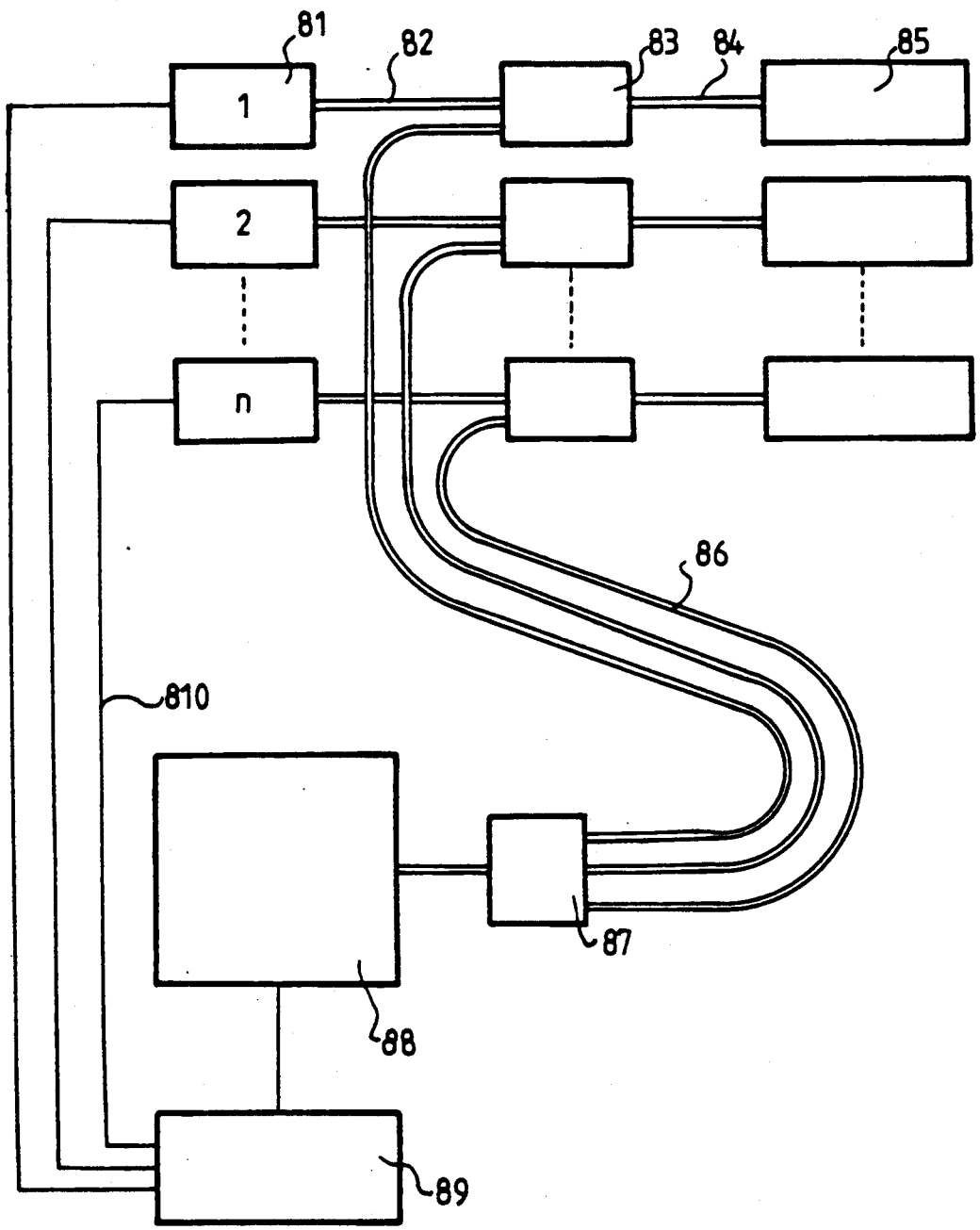
FIG. 8 is a diagram of a variant of the multisensor interferometric device with switched light source.

In another embodiment shown in FIG. 8, closely related to the embodiment of FIG. 3, the optical interferometric device for measuring multiple physical magnitudes includes an emitter device having plural optical sources (81-$l$ to 81-$n$) fed selectively by processing and switching device (89). Sources (81-$l$ to 81-$n$) respectively illuminate one by one branches (82-$l$ to 82-$n$) of an optical transmission assembly. The optical device also comprises a set of optical couplers (83-$l$ to 83-$n$) forming, with the optic fibres (82, 84, 86), n transmission systems (identical to the transmission system (b) described supra), a set of "n" detectors formed of measuring sensors (85-$l$ to 85-$n$), a measurement system (88) and a system (89) for processing and switching the light sources connected by n connections (810) to the sources (81). In this embodiment there are no addressing means and the fluxes reflected by each of the measurement sensors are combined before the input of the measurement interferometer by means of a concentrator (87) shown schematically in FIG. 4.

The ends of the n fibres (86-$l$ to 86-$n$) at the output of the optical fibre system are combined together into a circular bundle having a diameter such that it effectively contains these fibres. These fibres are then bonded together and the surface perpendicular to their axes is trued, polished and coupled to concentrator (87). Concentrator (87) has an input face (870) having a diameter greater than the diameter of the bundle of the n fibres (86-$l$ to 86-$n$). The concentrator (87) is formed by drawing out a glass or plastic bar to obtain a fiber with decreasing cross-section and low angle. If the angle is not too great, a light flux may be obtained at the end (871) having the smallest diameter, which is close to the input flux, FIG. 4. This flux is sequentially the flux emitted by each of sources (81-$l$ to 81-$n$).

A processing system (89) connected to a photodetector of measurement interferometer (88) identical to the assembly (9) in FIG. 3 makes it possible to obtain, from optical path variation measurements $D_{c1}$ and $D_{c2}$ corresponding to the correlation maximum, the physical magnitudes measured in each of sensors 8.

Figure 9:
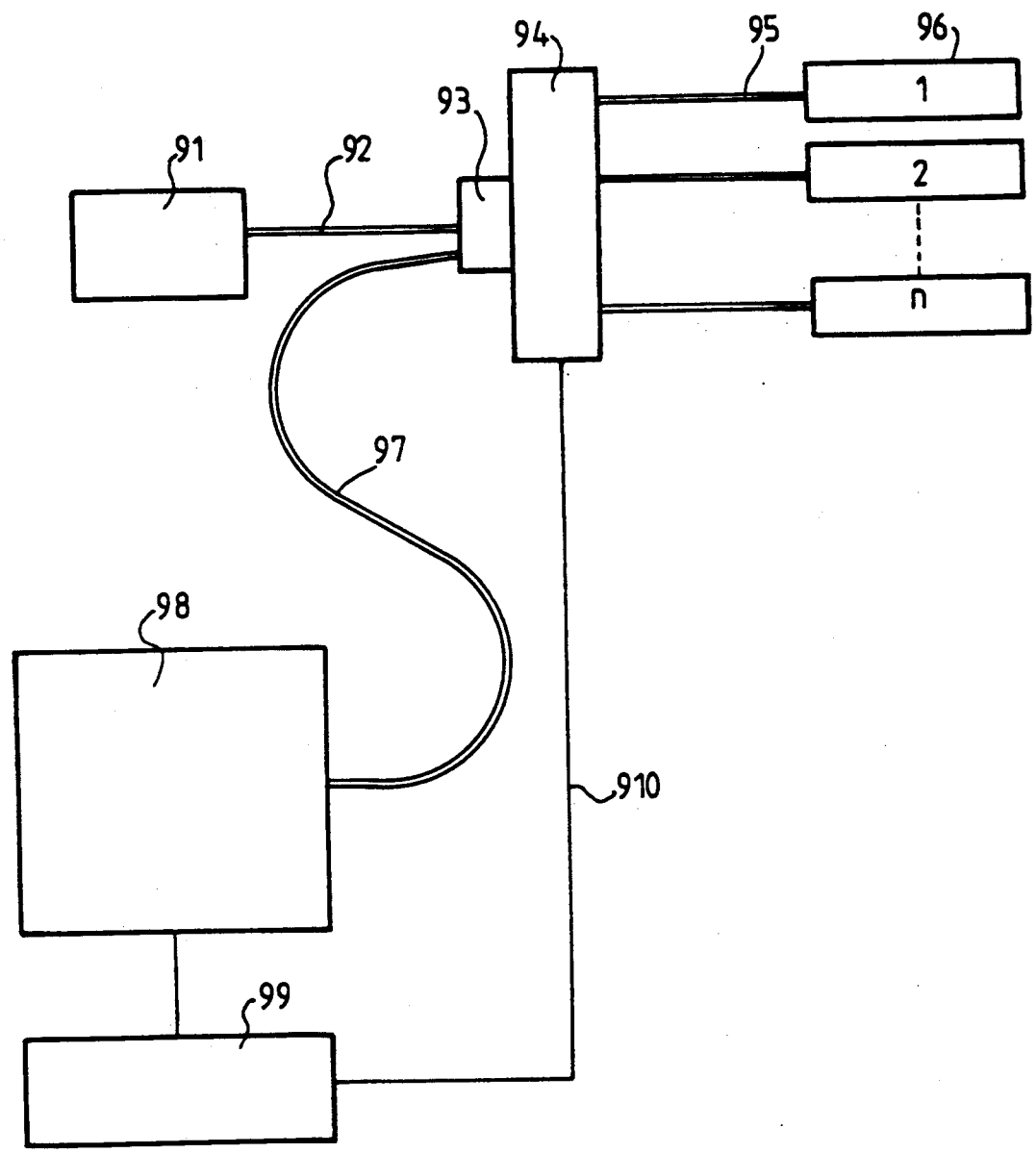
FIG. 9 is a diagram of a variant of the multisensor interferometric device with a light source and a single analyzer.

Another variant, shown in FIG. 9, includes a multi sensor instrumentation system (96) connected to a single analysis interferometer (98) by a device for switching the measuring paths from the sensors. The system is fed by a light source (91) connected by an optical fibre (92) to a coupler (93) coupled to an optical path switch (94) controlled by a connection (910) coming from the processing and control circuit (99). Each of the paths (95-$l$ to 95-$n$) formed by an optical fibre is connected to a respective sensor (96-$l$ to 96-$n$) The coupler (93) transmits the switched path to the fibre (97), coupled to the analysis and measurement system (98) similar to system (9) in FIG. 3. In the two above described embodiments, the n composite channelled spectra, each coming from one of the selectively illuminated double sensors, are sequentially analyzed one after the other by the processing system (89) or (99).

Figure 10:
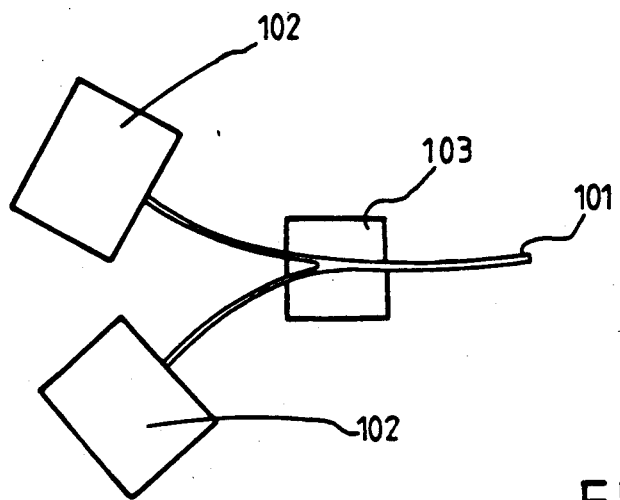
FIG. 10 is a diagram of a multianalyzer device.

The last variant may include, as shown in FIG. 10, several measurement devices (102) of the above described type and a spark gap (103), wherein each of the measurement devices (102) is switchable to improve the assembly availability.

Naturally, the invention is no wise limited by the features which have been specifically described above or by the details of particular embodiments chosen for illustrating the invention. All sorts of variants may be made to the particular embodiments which have been described by way of example and to their component elements without departing from the scope and spirit of the invention. The invention covers all the means forming technical equivalents of the means described as well as combinations thereof. In particular, in the analysis systems shown in FIGS. 8 to 10, double or single interferometric sensors may be used depending on the degree of accuracy desired for the physical magnitude measured.

We claim:

1. An interferometric sensor responsive to temperature and pressure to be sensed comprising first and second parallel interferometers respectively having concentric central and external light paths, a collimating lens, an optical fiber located at a focal point of the collimating lens, the interferometers being response to optical energy coupled to them via the optical fiber and lens and coupling optical energy back to the optical fiber via the lens, the first interferometer including a deformable membrane having a deformation responsive to the pressure and the temperature to be sensed, the deformation causing the membrane position to vary with respect to a face of a first glass plate having parallel faces that move as a function of the temperature and pressure to be sensed, the second interferometer including two glass plates having differing coefficients of thermal expansion, the plates being held in position by a cylindrical spacer, the spacing between parallel faces of said two glass plates, varying as a function of the different expansion coefficients of said two plates, the optical energy coupled back to the fiber by the two interferometers being combined in the optical fiber to provide two different channelled spectra of an optical source illuminating the fiber and indicative of the different distances traversed by optical energy of the source in the first and second interferometers.

2. An interferometric sensor responsive to temperature and pressure to be sensed comprising first and second parallel interferometers respectively having concentric central and external light paths; a collimating lens, an optical fiber located at a focal point of the collimating lens, the interferometers being responsive to optical energy coupled to them via the optical fiber and lens and coupling optical energy back to the optical fiber via the lens, the first interferometer including a deformable membrane having a deformation responsive to the pressure and the temperature to be sensed, the deformation causing the membrane position to vary as a function of the temperature and pressure to be sensed with respect to a face of a first glass plate, the second interferometer including a polarizer and a bi-refringement plate having bi-refringence that varies as a function of the temperature to be sensed, the optical energy coupled back to the fiber by the two interferometers being combined in the optical fiber to provide two different channelled spectra of an optical source illuminating the fiber and indicative of the different distances traversed by optical energy of the source in the two interferometers.

3. An interferometric sensor responsive to temperature and pressure to be sensed comprising first and second parallel interferometers each having concentric central and external light paths; a collimating lens, an optical fiber located at a focal point of the collimating lens, the interferometers being responsive to optical energy coupled to them via the optical fiber and lens and coupling optical energy back to the optical fiber via the lens, the first interferometer including a polarizer and a bi-refringement plate having a bi-refrigence that varies mainly as a function of the pressure to be sensed, the second interferometer including two glass plates having differing coefficients of thermal expanse, the plates being held in position by a cylindrical spacer, the spacing between parallel faces of said two glass plates varying as a function of the different expansion coefficients of said two plates, the first and second interferometers being arranged so optical energy coupled back to the fiber by the first and second interferometers is combined in the optical fiber to provide two different channelled spectra of an optical source illuminating the fiber and indicative of the different distances traversed by optical energy of the source in the first and second interferometers.

4. An interferometric sensor responsive to temperature and pressure to be sensed comprising first and second parallel interferometers each having concentric central and external light paths; a collimating lens, an optical fiber located at a focal point of the collimating lens, the interferometers being responsive to optical energy coupled to them via the optical fiber and lens and coupling optical energy back to the optical fiber via the lens, the first interferometer including a first polarizer and a first bi-refringement plate having a bi-refringence that varies mainly as a function of the pressure to be sensed, the second interferometer including a second polarizer and a second bi-refringent plate having a bi-refrigence that varies as a function of the temperature to be sensed, the first and second interferometers being arranged so optical energy coupled back to the fiber by the first and second interferometers is combined in the optical fiber to provide two different channelled spectra of an optical source illuminating the fiber and indicative of the different distances traversed by optical energy of the source in the first and second interferometers.

5. An interferometric sensor responsive to temperature and pressure to be sensed, comprising first and second interferometers in series so a single optical beam traverses them, a collimating lens, an optical fiber located at a focal point of the collimating lens, the interferometers being responsive to optical energy coupled to them via the optical fiber and lens and coupling optical energy back to the optical fiber via the lens, the first interferometer including a deformable membrane having a deformation responsive to the pressure and the temperature to be sensed, the deformation causing the membrane position to vary as a function of the temperature and pressure to be sensed with respect to a face of a first glass plate, the second interferometer including a polarizer and a bi-refringent plate having a bi-refringence that varies as a function of the temperature to be sensed, the first and second interferometers being arranged so the optical energy coupled back to the fiber by the first and second interferometers is combined in the optical fiber to provide two different channelled spectra of an optical source illuminating the fiber and indicative of the different distances traversed by optical energy of the source in the first and second interferometers.

6. An interferometric sensor representative to temperature and pressure to be sensed, comprising first and second interferometers in series so a single optical beam traverses them, a collimating lens, an optical fiber located at a focal point of the collimating lens, the interferometers being responsive to optical energy coupled to them via the optical fiber and lens and coupling optical energy back to the optical fiber via the lens, the first interferometer including a deformable membrane having a deformation responsive to the pressure and temperature to be sensed, the deformation causing the membrane position to vary as a function of the temperature and pressure to be sensed, the second interferometer including two glass plates having differing coefficients of thermal expanse, said two plates being held in position by a cylindrical spacer, the spacing between parallel faces of said two glass plates varying as a function of the different expansion coefficients of said two plates, the first and second interferometers being arranged so the optical energy coupled back to the fiber by the first and second interferometers is combined in the optical fiber to provide two different channelled spectra of an optical source illuminating the fiber and indicative of the different distances traversed by optical energy in the source in the two interferometers.

7. An interferometric sensor responsive to temperature and pressure to be sensed, comprising first and second interferometers in series so a single optical beam traverses them, a collimating lens, an optical fiber located at a focal point of the collimating lens, the interferometers being responsive to optical energy coupled to them via the optical fiber and lens and coupling optical energy back to the optical fiber via the lens, the first interferometer including a polarizer and a bi-refringent plate having a bi-refringence that varies mainly as a function of the pressure to be sensed, the second interferometer including two glass plates having differing coefficients of thermal expansion, said two glass plates being held in position by a cylindrical spacer, the spacing between parallel faces of said two glass plates varying as a function of the different expansion coefficients of said two plates, the optical energy coupled back to the fiber by the first and second interferometers being combined in the optical fiber to provide two different channelled spectra of an optical source illuminating the fiber and indicative of the different distances traversed by optical energy of the source in the two interferometers.

8. An interferometric sensor responsive to temperature and pressure to be sensed, comprising first and second interferometers in series so a single optical beam traverses them, a collimating lens, an optical fiber located at a focal point of the collimating lens, the interferometers being responsive to optical energy coupled to them via the optical fiber and lens and coupling optical energy back to the optical fiber via the lens, the first interferometer including a bi-refringent plate having bi-refringence that varies as a function of the temperature to be sensed, the second interferometer including two glass plates having differing coefficients of thermal expanse, said two glass plates being held in position by a cylindrical spacer, the spacing between parallel faces of said two glass plates varying as a function of the different expansion coefficients of said two plates, the optical energy coupled back to the fiber by the two interferometers being combined in the optical fiber to provide two different channelled spectra of an optical source illuminating the fiber and indicative of the different distances traversed by optical energy of the source in the two interferometers.

9. Interferometric optical device for monitoring multiple physical magnitudes that cause variations on optical path lengths, said device comprising:
an optical emitter of a wide spectral band;
a detector including first and second interferometers responsive to the wide spectral band for deriving a composite channeled spectrum indicative of the difference in path lengths $D_{c1}$ and $D_{c2}$ of the first and second interferometers, respectively, the path lengths being controlled by the monitored physical magnitudes;
an optical fiber over which propagates the optical energy from the emitter device to the detector and the light flux reflected by the detector;
an analysis device for analyzing information represented by the light flux derived from the detector assembly and for deriving a value representative of physical magnitudes controlling the values $D_{c1}$ and $D_{c2}$, the analysis device comprising:
a two wave measurement interferometer having an input collimator illuminated by the optical energy propagating toward it from an end of the optical fiber, a reference mirror from which a first part of the collimated optical flux derived from the first and second interferometers is reflected, and a second mirror from which a second part of said collimated light flux is reflected, and means for combining the fluxes reflected from the first and second mirrors to derive a resultant flux;
a photoelectric detector responsive to the resultant optical flux for deriving a signal having a value indicative of the intensity of the resultant optical flux derived from the measurement interferometer; and
an assembly responsive to the signal derived from the photoelectric detector for deriving a value representative of the physical magnitudes, the second mirror being fixed on a piezoelectric micropositioner-measurer for controlling and determining the absolute position of the second mirror corresponding to the maximum optical intensity of the resultant optical flux incident on the photoelectric detector and for deriving therefrom the values of $D_{c1}$, $D_{c2}$.

10. The device of claim 9 wherein N second mirrors are includes, where N is an integer greater than one, each of the second mirrors being mounted on a corresponding micropositioner-measurer, at least one of which is responsive to a physical magnitude to be sensed, another of the second mirrors being arranged to control a reference point of the measurement interferometer.

11. The device of claim 9, further including plates of closely related thicknesses located in front of the first and second mirrors of the measurement interferometer for providing an optical path difference of the paths including the first and second mirrors.

12. The device of claim 9 further including a plate located in front of one of the first and second mirrors for shifting a reference position of the measurement interferometer over a considerable range.

13. The device of claim 9 wherein there are provided several sensors for measuring several physical magnitudes at several points.

14. The device of claim 9 wherein the optical source includes an elementary emitting source of optical energy, a switch illuminated by energy from the source, the switching being located in front of a set of optical fiber branches, said assembly being formed of N fibers and N sensors, where N is an integer greater than one, the switch being controlled so as to derive selectively each of the channelled spectra derived by each of the N sensors on a one-by-one basis, the switch being responsive to optical energy derived from the optical fiber illuminating the input collimator.

15. The device of claim 14 further including a spark gap, N of said measurement devices being configured as a star responsive to optical energy of the spark gap, the measurement devices being switchable to improve the availability of the analysis device.

16. The device of claim 9 wherein the emission source includes N elementary sources activated to deliver the optical flux over a set of optical paths to N sensors and to return the optical flux over a set of optical paths to a concentrator for coupling to an input collimator of the measurement interferometer, where N is an integer greater than one.

17. The device of claim 16 wherein return optical fibers include branches that are bonded and grouped together in a circular bundle having a trued and polished surface perpendicular to the axis of the fibers.

18. The device of claim 16 wherein the concentrator includes a fiber having decreasing section of small angle, the concentrator fiber having an input section with a greater area than the area of a bundle of return fibers.

19. The device of claim 18 wherein the concentrator fiber is a drawn glass bar.

20. The device of claim 9 wherein the wide spectral band emission source includes an elementary wide band source having a maximum amplitude centered on the attenuation minimum of the fiber responsive to the source.

21. The device of claim 20 wherein the emission source includes a dichroic plate, a first light emitting diode having a spectrum centered on a total reflection wavelength of the dichroic plate and a second diode having a spectrum centered on the total transmission wavelength of the dichroic plate, said first and second diodes illuminating the dichroic plate.

22. Apparatus for monitoring pressure and temperature comprising first and second interferometers having beam paths originating at an optical fiber located at a collimating lens focal point; the first interferometer including a deformable membrane having a deformation responsive to the sensed pressure and temperature causing the membrane position along the beam path to vary with respect to a face of a glass plate, parallel to the membrane; the second interferometer including an optical path length that varies as a function of the sensed temperature, the collimating lens being positioned to collect optical beams derived from the first and second interferometers and supply them to the optical fiber.

* * * * *